United States Patent [19]

Abels et al.

[11] 4,184,561

[45] Jan. 22, 1980

[54] STEERABLE AXLE ASSEMBLY FOR A FLOOR-TYPE INDUSTRIAL VEHICLE

[75] Inventors: Theodor Abels, Aschaffenburg; Guenther Honecker, Klein-Welzheim; Bernhard Goetz, Aschaffenburg, all of Fed. Rep. of Germany

[73] Assignee: Linde Aktiengesellschaft, Höllriegelskrueth, Fed. Rep. of Germany

[21] Appl. No.: 836,847

[22] Filed: Sep. 26, 1977
(Under 37 CFR 1.47)

[30] Foreign Application Priority Data

Sep. 24, 1976 [DE] Fed. Rep. of Germany ....... 2642904

[51] Int. Cl.[2] .............................................. B62D 5/10
[52] U.S. Cl. ................................................... 180/155
[58] Field of Search ............... 180/154, 155, 156, 157, 180/158, 159, 160

[56] References Cited

U.S. PATENT DOCUMENTS

| 3,480,100 | 11/1969 | Gaulke | 180/155 |
| 3,994,362 | 11/1976 | Penington | 180/156 |

FOREIGN PATENT DOCUMENTS 1404008 8/1975 United Kingdom ................. 180/155

Primary Examiner—John A. Pekar
Attorney, Agent, or Firm—Karl F. Ross

[57] ABSTRACT

A steerable axle assembly for a floor-type industrial vehicle, preferably a fork-lift truck, comprises an elongated axle body in the form of a housing having a box-shaped profile within which the tie bars and other important parts of the steering mechanism, e.g. a hydraulic cylinder for operating same, are provided. The axle housing is open to one side, preferably forwardly or rearwardly.

6 Claims, 4 Drawing Figures

STEERABLE AXLE ASSEMBLY FOR A FLOOR-TYPE INDUSTRIAL VEHICLE

CROSS-REFERENCE TO RELATED APPLICATIONS

The present application is related to application Ser. No. 836,849 filed concurrently herewith by Günter Honecker as well as to our concurrently filed copending application Ser. No. 836,851 and to the concurrently filed copending application Ser. No. 836,850, now U.S. Pat. No. 4,137,990 of Theodor Abels.

FIELD OF THE INVENTION

The invention relates to an axle assembly for a floor-type industrial vehicle, such as a fork-lift truck, and, more particularly, to an improved axle assembly for the steerable wheels of such a vehicle.

BACKGROUND OF THE INVENTION

In general, the axle assembly for the steerable wheels of a floor-type industrial vehicle, such as a fork-lift truck, must permit a high degree of angular displacement of each of the steerable wheels to provide for the necessary maneuverability of the vehicle into close spaces and with a minimum of turning room.

Fork-lift trucks have thus been provided with axle assemblies which comprise an elongated axle body upon which the steerable wheels are pivotally mounted at the ends of this body and a tie bar which connects these wheels with a steering knuckle swingably mounted upon the body intermediate these ends. In addition, it is a common practice to provide a hydraulic cylinder which is coupled with the steering linkage to actuate the latter.

In conventional steering-axle assemblies of this type, the tie bars are generally disposed above or below the axle body, usually the latter, and the hydraulic cylinder is likewise disposed outside the axle body.

The hydraulic cylinder is either swingably mounted upon the axle body or on the vehicle frame or chassis to which the axle body is secured. This latter arrangement has the disadvantage that the steering forces are transferred from the vehicle frame and the fastening elements to the axle body.

When the steering knuckle and/or the tie bar or tie bars or the hydraulic cylinder are disposed outside of the axle body, these elements can be subjected to impact and have tendency to bend, thereby damaging the steering linkage or interferring therewith. The elements of the steering linkage thus are exposed to external effects and can be nicked, bent or otherwise affected.

All of these have proved to be disadvantageous in such industrial or floor vehicles as fork-lift trucks and have been found to be most detrimental when the steering linkage must impart a small turning radius to the vehicle.

OBJECTS OF THE INVENTION

It is the principal object of the present invention to provide an improved axle assembly for the steerable wheels of a vehicle whereby these disadvantages are obviated.

Still another object of this invention is to provide an axle assembly for the steerable wheels of an industrial or floor vehicle such as a fork-lift truck which has a relatively small height, affords desirable protection to the moving elements of the steering linkage and in general is both relatively inexpensive and highly reliable.

SUMMARY OF THE INVENTION

These objects and others which are attained in accordance with the present invention are realized by providing the axle body at least over a substantial portion of its length with a box-like profile in cross section parallel to the longitudinal vertical median plane of the vehicle and hence perpendicular to the axis of elongation of the axle body, at least the major part of the tie bars, the steering knuckle and preferably also the hydraulic piston and cylinder for operating the steering linkage being received within this box-shaped profile.

According to the invention, the box-shaped profile is open to one side, preferably forwardly or rearwardly with respect to the direction of travel of the vehicle.

The system of the present invention has been found to be most advantageous because it not only provides practically full protection for the hydraulic cylinder and the tie bars, but also protects other important parts of the steering linkage and, in addition, allows the steering linkage to have a relatively small height.

It has been found to be advantageous, moreover, when the hydraulic cylinder and the steering knuckle are journaled on a common pivot pin received in the axle body or housing and preferably spanning substantially horizontal upper and lower walls thereof across the open side of the housing. The opposite side of the housing is closed by a substantially vertical wall which can have an outward bulge in the region of the steering knuckle, the latter extending toward this bulge from the pivot pin.

According to an important feature of the invention, each of the steering wheels is provided with an axle which is carried by a respective axle carrier connected by a pivot to one end of the elongated axle housing. Each carrier is connected by a respective tie bar to the steering knuckle, the pivots between the knuckle and each tie bar, the pivots between each tie bar and the respective axle carrier, and the pivots of each axle carrier to the axle housing being formed with pivot axes which are parallel to the axis of the aforementioned pin.

Advantageously, the entire axle housing or assembly is mounted upon the vehicle frame or chassis by a pair of ball joints whose centers lie in the plane of the axis of the aforementioned pivot pin which the tie bars and the pivots thereof extend symmetrically to opposite sides of this plane.

BRIEF DESCRIPTION OF THE DRAWING

The above and other objects, features and advantages will become more readily apparent from the following description, reference being made to the accompanying drawing in which.

SPECIFIC DESCRIPTION

Figure 1:
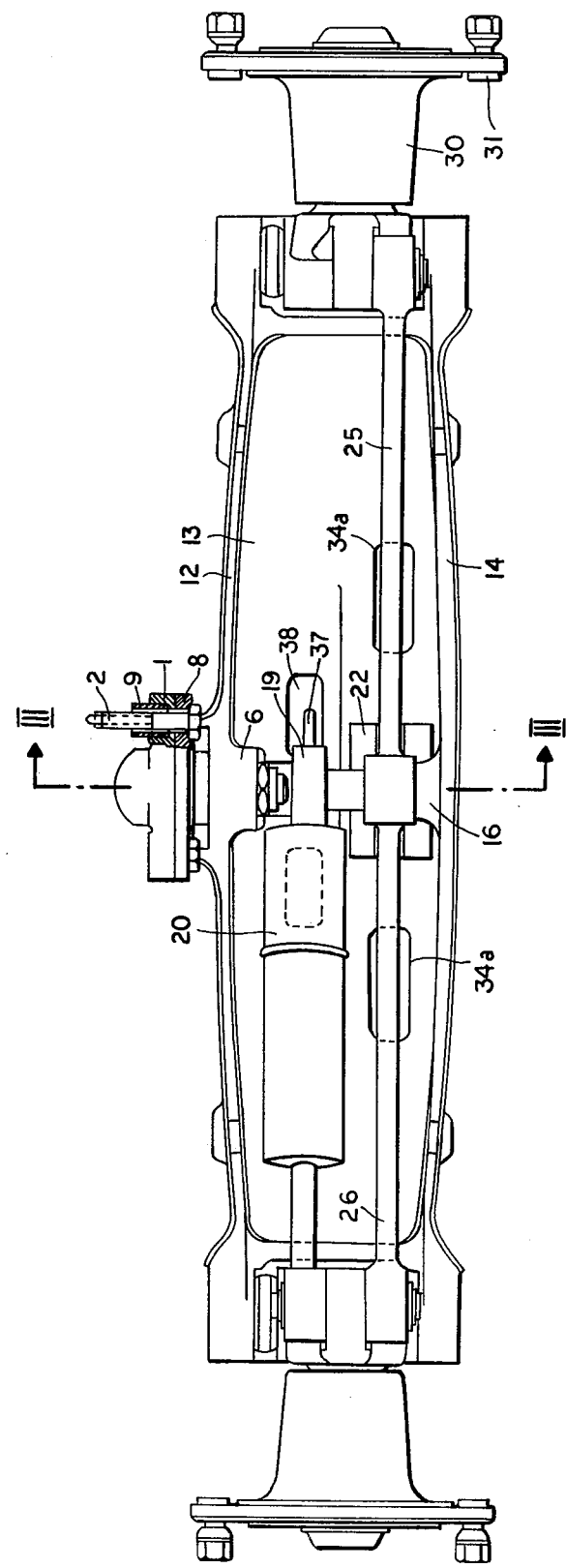
FIG. 1 is an elevational view of an axle assembly for the steerable wheels of a forklift truck as seen from the rear, partly broken away.

The axle assembly shown in FIGS. 1 through 4 is intended to be mounted upon the frame or chassis of a forklift truck or like industrial vehicle, the frame or chassis being unillustrated in the drawing.

More specifically, the axle assembly comprises a pair of mounting plates 1 which are intended to be affixed to the frame, not shown, of the vehicle. Each of the mounting plates 1 is formed with a ball-shaped receptacle 1a (see FIGS. 2 and 3) in which a ball head 3 is received. Each of the ball heads 3 has a pin 4 which extends through a projection 5 or 6 of the axle housing and is fixed thereto by a nut 7.

To prevent the ball heads 3 from pulling out of the sockets 1a of the mounting plates 1, below these ball heads there are provided form-fitting securing plates 8 which pass the ball members with clearance and are affixed from below to the vehicle frame. Stressing sleeves 9 ensure a firm connection between members 1 and 8. An elastic ring is disposed between each of the plates 8 and the housing lugs 5 and 6 to form a seal around the balls 3 as shown at 10 in FIG. 3.

The axle housing, which is formed with the forward projection or lug 5 and the rearward projection or lug 6 previously mentioned is represented generally at 100 and comprises an upper horizontal wall 12, a rear wall 13 and a lower wall 14. One side of the housing is thus open at 100a.

The rear wall 13 is formed at its lower central portion with an outward bulge 13a. In the vertical median plane through the housing, corresponding to the plane of the section line III—III, the upper wall 12 is formed with a downwardly extending boss 15 while the bottom wall 14 is formed with an upwardly extending boss 16. These bosses 15 and 16 are formed with aligned bores 17 into which a pivot pin 18 is press-fitted.

A pivot head 19 of a hydraulic cylinder 20, serving to displace the steering mechanism, is swingably mounted upon the pin 18.

Below the head 19, also upon this pin 18, there is provided a spacing sleeve 21 and below the spacing sleeve, the pivot head 22a of a steering knuckle or central member 22.

In the central member 22, by respective pivots 23 and 24, two tie bars 25 and 26 are mounted.

The tie bar 25 is pivotally connected by a pin 29 to an axle carrier 28a upon which the right hand axle 28 is affixed. The axle carrier 28a is pivotally connected by the pin 27 to the right hand end of the axle housing 100. The axle 28, in addition, carries the wheel hub 30 to which, by screws 31, the felly or rim of the right hand wheel can be affixed to this hub.

Similarly, the axle 32 carrying the hub 30 and the wheel bolts for the left hand wheel is mounted upon an axle carrier which is pivoted at 27 to the housing and is connected by a pivot bolt or pin 33 with the tie bar 26.

The bolt or pin 33 is made somewhat longer than the bolt of pin 29 to accommodate the pivot head of the rod 35 of the hydraulic cylinder 20. Thus the hydraulic cylinder 20 acts upon the carrier for the left hand wheel as can be seen from FIG. 2.

The working chamber on the piston rod side of this cylinder is connected via a line 36 which can be pressurized by any conventional steering control (not shown) for the forklift truck. The working chamber of the cylinder at the piston side is connected via a bore 36a with line 37 passing through a window 38 in the rear wall 13 of the axle housing 100.

The rear wall 13 is also formed with cutouts 34a to permit full displacement of the tie rods 25 and 26 and thus prevent these divided tie rod members from contacting the wall 13.

The axes of the pivot pins or bolts, 18, 23, 24, 27, 29 and 33 are all parallel to one another, generally perpendicular to the walls 12 and 14 and substantially parallel to the wall 13. They are also substantially perpendicular to the plane of the tie bars 25 and 26.

Figure 4:
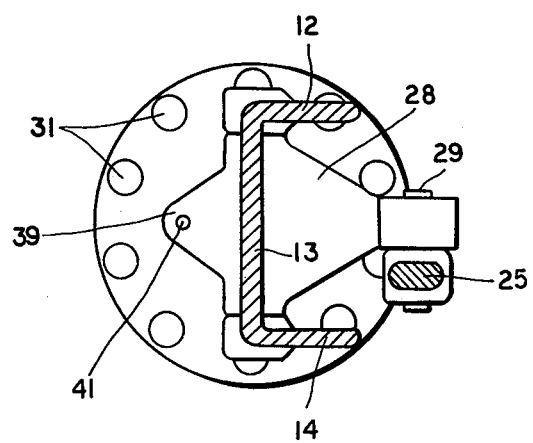
FIG. 4 is a cross-sectional view taken along the line IV—IV of FIG. 2.

As can be seen especially from FIG. 4, the tie bars 25 and 26 are of substantially rectangular cross section and constitute bodies of identical bending strength and stiffness. This has been found to be essential for effective utilization of the axle assembly of the present invention.

Each of the axle carriers 28a, 32a is provided with a projection 39 in which an adjusting screw 41 is threaded and locked in place by a counternut 40. The screw 41 sets the maximum angular displacement of the respective axle carriers about the pivots 27 and thus prevents the tires carried by the respective wheels from coming to rest against the rear wall 13 or, in the opposite direction, against the hydraulic cylinder 20.

Figure 2:
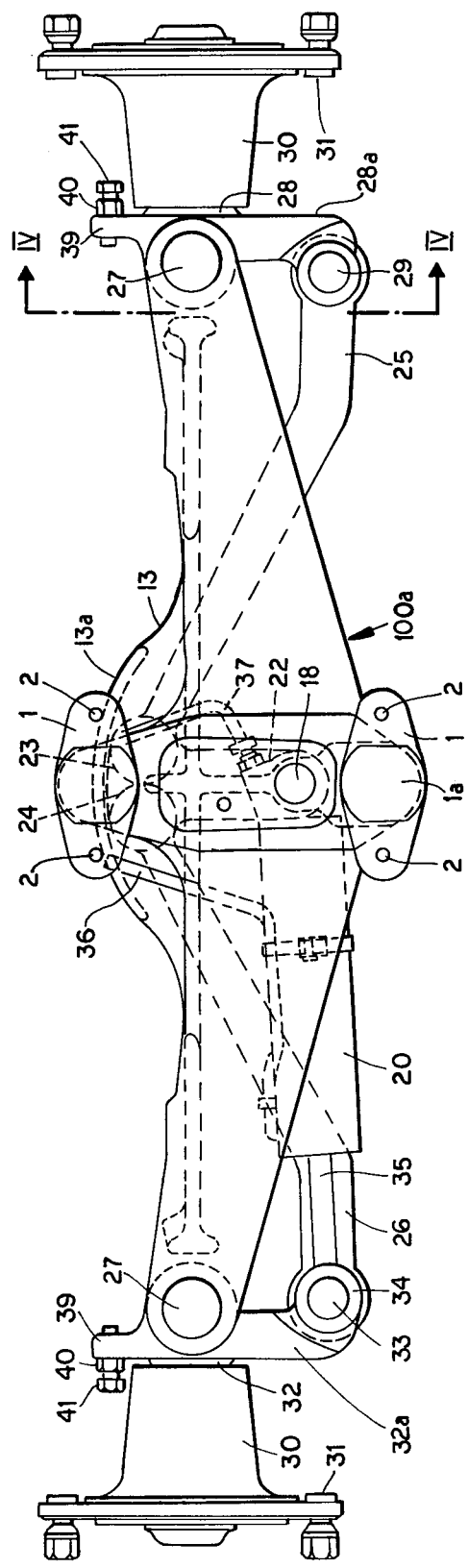
FIG. 2 is a plan view of the axle assembly.

It is important, as noted, that the members 25 and 26 have the same bending strength and stiffness in a plane corresponding to the plane of FIG. 2 and perpendicular to the plane of FIG. 1.

Figure 3:
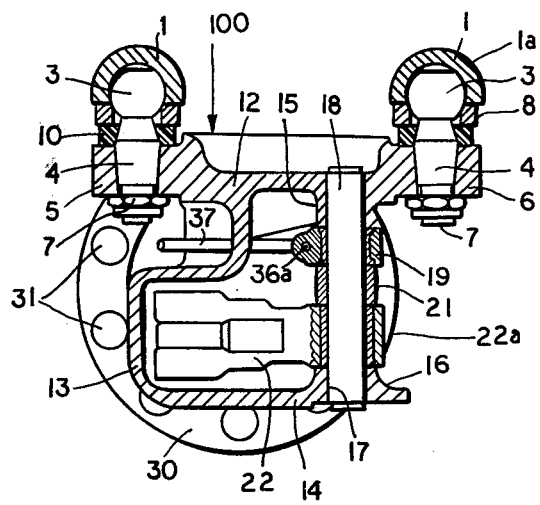
FIG. 3 is a cross-sectional view taken along the line III—III of FIG. 1.

As can be seen from FIGS. 2 and 3 of the drawing, the centers of the ball joints formed by the balls 3 lie in a vertical plane of the axis of the shaft or pin 18 and define a line which is perpendicular to this pin 18. Furthermore, the pin 18 forms a common element supporting the knuckle 22 and the head 19 at the end of the cylinder 20 so that the pivots for the cylinder and for the knuckle are coaxial.

We claim:

1. A steering axle assembly for a floor-type industrial vehicle, preferably a fork-lift truck, comprising:
    an elongated axle body adapted to be secured to said vehicle and having a box-shaped profile in a plane perpendicular to the longitudinal dimension of the axle body, whereby said body forms a housing, said housing being formed with a substantially horizontal upper wall, a substantially horizontal lower wall and a substantially vertical wall interconnecting said upper and lower walls along one side of said housing, the opposite side of said housing being open;
    a steering knuckle pivotally mounted in said housing;
    a pair of wheel axles pivotally mounted on said housing at opposite ends thereof;
    respective tie bars pivotally connected to said knuckle and to said axles, said tie bars being received at least in major part within said housing
    a hydraulic piston and cylinder for displacing said knuckle and said tie bars and received at least in part within said housing; and
    a pivot pin spanning said open side of said housing between said upper and lower walls, said substantially vertical wall having an outward bulge opposite said pin, said knuckle being swingably mounted on said pin and reaching into said bulge.
2. The assembly defined in claim 1 wherein said housing is open forwardly with respect to the direction of displacement of the vehicle.
3. The assembly defined in claim 1 wherein said housing is open rearwardly with respect to the direction of displacement of said vehicle.
4. The assembly defined in claim 1 wherein said cylinder is pivotally mounted upon said pin.

5. The assembly defined in claim 4 wherein each of said axles is affixed to an axle carrier pivoted on a respective end of said housing and each of said tie bars is pivotally connected to one of said carriers, said cylinder having a piston rod pivotally connected to one of said carriers.

6. The assembly defined in claim 5 wherein said pin, the pivot connections between said tie bars and said knuckles, the pivot connections between said tie bars and said carriers, and the pivot connections between said carriers and said housing all have mutually parallel axes.

* * * * *